Feb. 5, 1929.
A. ARUTUNOFF
MOTOR PROTECTOR
Filed April 15, 1927
1,701,468
4 Sheets-Sheet 1
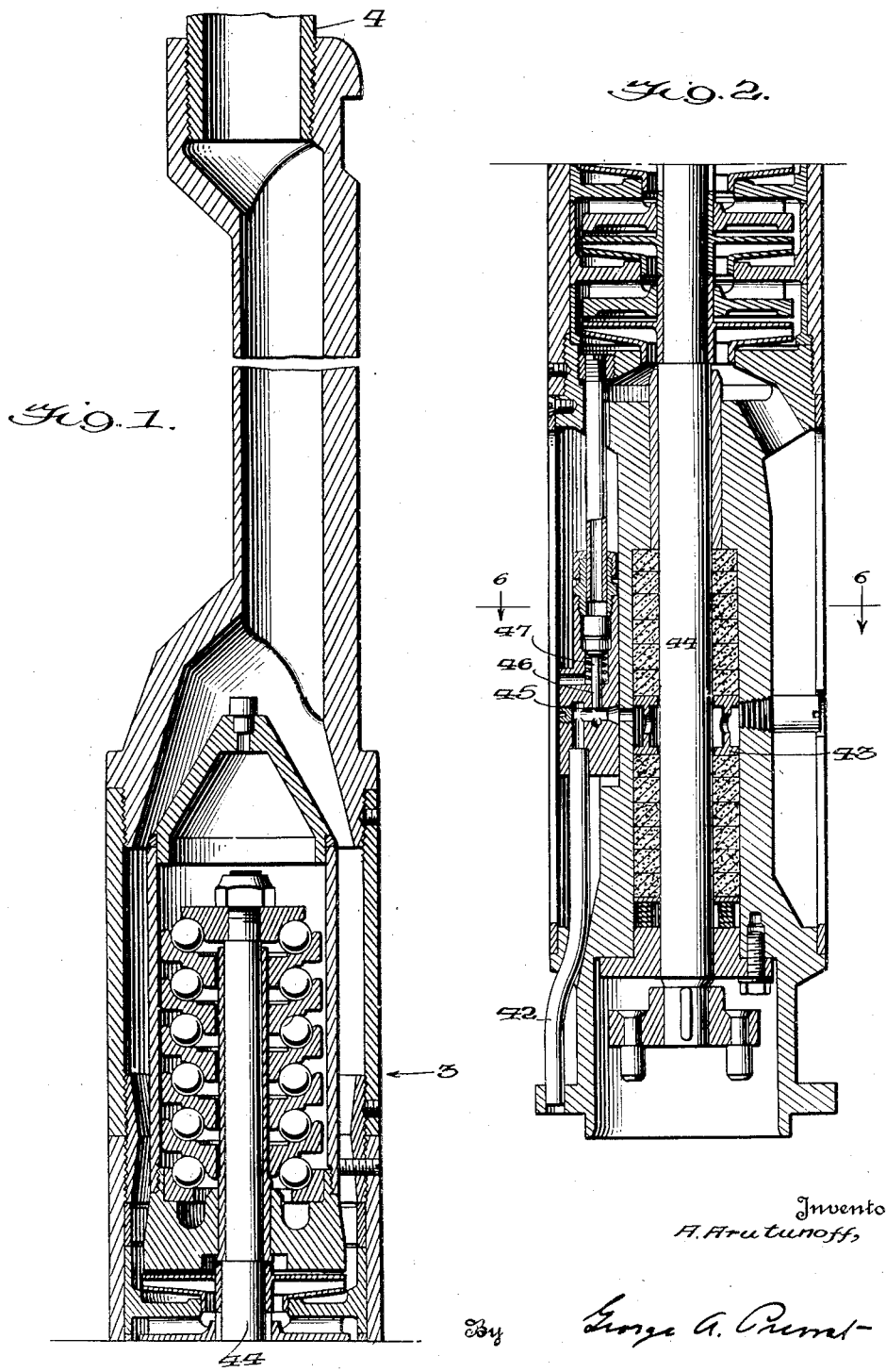

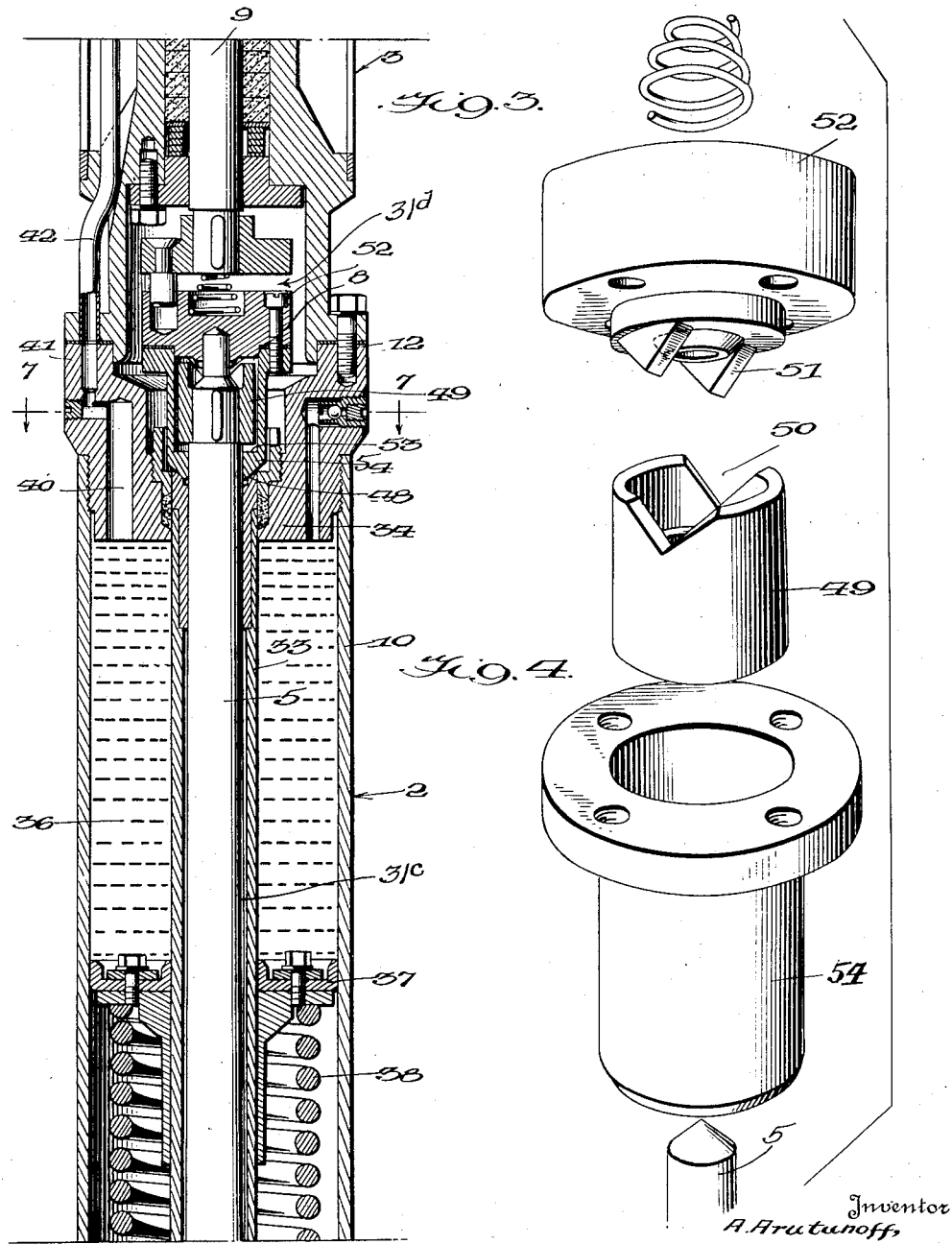

Feb. 5, 1929.
A. ARUTUNOFF
1,701,468
MOTOR PROTECTOR
Filed April 15, 1927 4 Sheets-Sheet 3
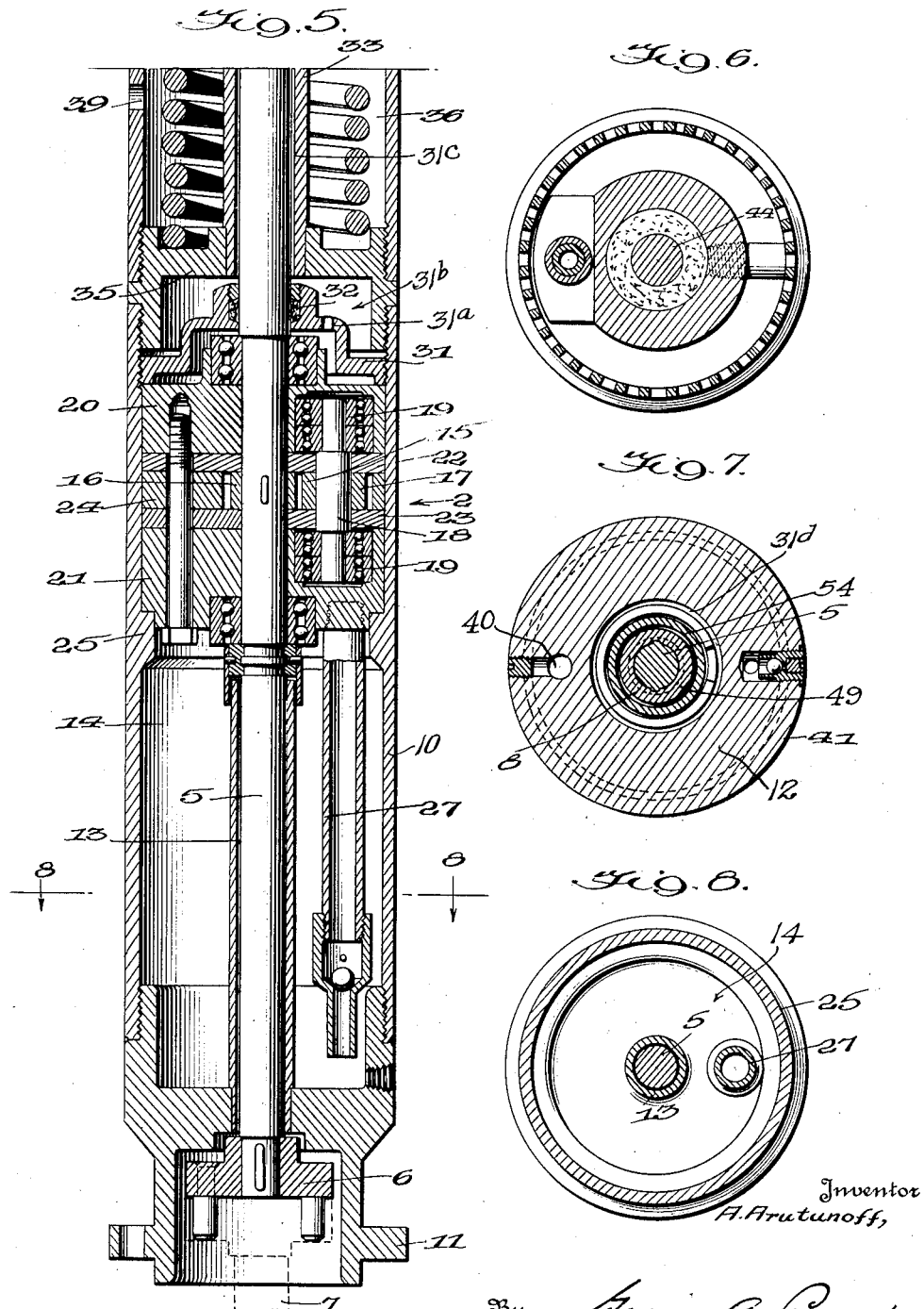

Feb. 5, 1929. 1,701,468
A. ARUTUNOFF
MOTOR PROTECTOR
Filed April 15, 1927 4 Sheets-Sheet 4

Inventor
A. Arutunoff,
By George A. Purcell
Attorney

Patented Feb. 5, 1929.

1,701,468

UNITED STATES PATENT OFFICE.

ARMAIS ARUTUNOFF, OF LOS ANGELES, CALIFORNIA.

MOTOR PROTECTOR.

Application filed April 15, 1927. Serial No. 183,990.

My invention consists in new and useful improvements in protectors for submerged electric motors employed in connection with deep well pumps and is an improvement on the structure shown and described in my Letters Patent No. 1,610,726, issued Dec. 14, 1926.

The object of the present invention is to provide a three fold protecting means for a motor, the vital parts of which are embodied in a single self contained unit.

Another object of my invention is to utilize a rotary type pump for circulating a liquid lubricant and creating a back pressure along the shaft to protect the motor from any leakage water or other deleterious liquid which may seep into the structure while it is submerged in the liquid being pumped.

A still further object of my invention is to provide a clutch member which will function as a valve to prevent leakage while the motor is at rest.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figs. 1 and 2 are the upper and lower sections of the pumping unit, the latter showing the grease seal.

Fig. 3 is a sectional view of the lower portion of the pumping unit and the upper portion of the protector unit secured together.

Fig. 4 shows enlarged perspective views of the valve acting clutch.

Fig. 5 is a view of the lower portion of the protector unit showing the back pressure pump.

Fig. 6 is a view taken on line 6—6, Fig. 2.

Fig. 7 is a view taken on line 7—7, Fig. 3.

Fig. 8 is a view taken on line 8—8, Fig. 5.

Figure 9:
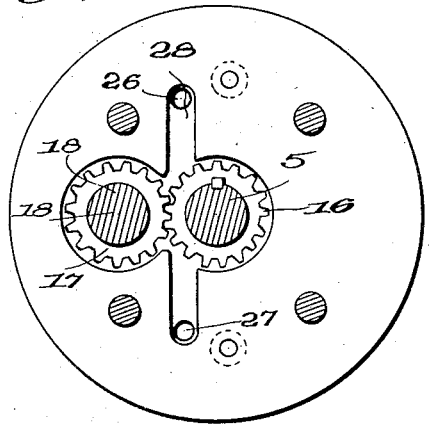
Figs. 9 and 10 are enlarged views of the back pressure pump.

In the drawings 1 represents an electric motor unit, 2 a motor protecting unit and 3 a pump unit of any type. These three units are suspended from the discharge line 4, the protecting unit 2 being interposed between the pump unit 3 and the motor unit 1 which latter unit is the lowermost of the whole system.

The motor protecting unit 2 consists of a shaft 5 having a coupling 6 at its lower extremity adapted to engage the upper end of the motor shaft 7. The upper extremity of said shaft 5 is provided with a clutch member 8 for operatively engaging the lower end of the pump shaft 9 as will be hereinafter described. 10 represents a casing for enclosing the shaft 5 and the working parts of the protecting unit, and is provided at its opposite extremities with flange couplings or other suitable water tight fittings 11 and 12 adapted to be secured to the adjacent ends of the motor and pump units respectively.

The lower end of the shaft 5 is surrounded by a sleeve 13 which is arranged in an oil reservoir 14 in the lower end of the casing 10. Adjacent the reservoir 14 is an auxiliary lubricating oil pump 15 which in the preferred form of my invention consists of a gear 16 driven by the shaft 5 and operatively engaging another gear 17 rotatably mounted on a short shaft 18 supported in bearings 19 secured in the end walls 20 and 21. These gears are enclosed by upper and lower face plates 22 and 23 and arranged in the pump housing 24 between said end walls, which complete structure is supported by the inwardly extending shoulder 25 on the casing 10.

Figure 10:
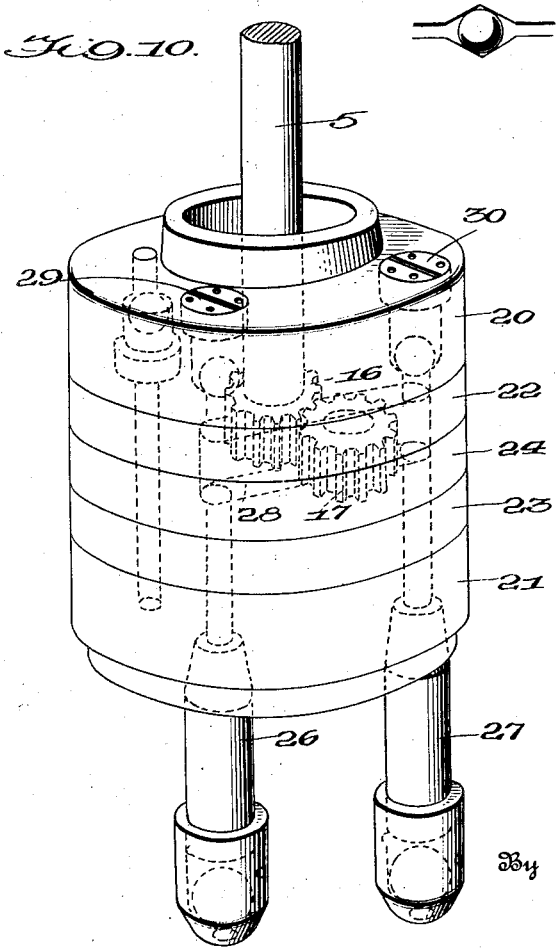
Figure 11:
Fig. 11 is a perspective view of the three units assembled.

The lower end wall 21 is provided with two suction valves 26 and 27 the lower ends of which extend down into the reservoir 14 and the upper ends of each opening into one side of a chamber 28 on opposite sides of the gears 16 and 17 at their point of contact as shown in Figs. 9 and 10.

The upper end wall 20 is provided with two discharge valves 29 and 30 adjacent the suction valves 26 and 27 respectively and in communication with the chamber 28. The pump elements are secured in place by a cap 31 surrounding the shaft 5 which may be threaded to engage the inner surface of the casing 10 or otherwise secured, said cap being provided with a port 31ª and a felt washer 32; the latter being arranged around the shaft 5 for excluding impurities or foreign substances during assembly.

By this particular arrangement of valves and pump, it will be seen that irrespective of the direction of rotation of the shaft 5, the oil pump will function and pressure developed on the upper side of the pump will be exerted around the shaft 5 to prevent the leakage of fluid along said shaft.

Surrounding the shaft 5 above the auxiliary back pressure pump 15 is a sleeve 33 terminating at its upper end in the body of the upper member 34 of the protecting unit 2, and at its lower end in a partition 35 which partition serves as the bottom of a grease chamber 36 formed in said casing 10 between the casing and the sleeve 33.

37 represents a ring shaped piston slidably mounted on the sleeve 33 in the chamber 36 and actuated by the spring 38, to compress grease in the upper portion of said chamber 36. The piston is under the combined pressure of the spring 38 and the surrounding well pressure, due to the port 39 in the casing 10 below the piston 37.

The upper member 34 of the protecting unit is provided with a passage 40 which extends through the flange 41 of the pump unit and opens into a conduit 42 leading to a stuffing box 43 around the pump shaft 44, whereby said shaft is sealed with grease under pressure.

Although this grease seal may function equally as well while the pump is running or at rest, in view of the fact that the back pressure pump 15 protects the motor vehicle while running, I provide a cut out 45 to eliminate waste while the device is running. This cut out consists of a valve 46 actuated by a piston 47 controlled by the pressure of the main pump, whereby when pressure is developed by said main pump the valve 46 is closed and the feed of grease cut off.

The clutch member 8 on the shaft 5 which serves not only as a power transmitting element but as a valve, consists of three main parts which are located in a chamber 31$^d$. 54 designates a cylindrical valve member adapted to engage the seat 48 in the upper member 34 of the protecting unit. 49 represents a cylindrical member secured to the shaft 5 and provided in the periphery of its upper extremity with one or more recesses 50 adapted to be engaged by lugs 51 on the lower surface of a coupling member 52. In the particular design shown in Fig. 4 of the drawings, the recesses 50 and lugs 51 are of V-shape whereby when torque is applied to the member 49 on the shaft 5 the coupling member 52 will be raised which in turn will raise the valve member 54 until the inner shoulder 53 on the valve member 54 abuts the lower end of the member 49 causing said valve member to disengage the seat, thus preventing wear on the valve members when the apparatus is running and permitting oil from the chamber 14 to flow along the shaft 5, through passageway 31$^c$ and into the chamber 31$^d$.

Figure 12:
Fig. 12 is a modification of the clutch arrangement shown in Fig. 4.

It is obvious that the recesses and lugs 50 and 51 may be of other shapes than that just described. For instance as shown in Fig. 12, both members may be recessed with a rolling member interposed between.

The operation of my device is as follows:

In working condition the chamber 36 is filled with grease and the reservoir 14 is filled with oil. The filling of the chambers 31$^b$ and 31$^d$ and passageway 31$^c$ with oil may be accomplished by charging the reservoir 14 and setting the motor in operation, when any excess oil will be forced by the pump 15, through port 31$^a$ and into the chamber 31$^b$, passageway 31$^c$ and chamber 31$^d$, after which the whole system is in normal working condition, at this time the level of oil in the reservoir 14 is just above the lower ends of the suction valves 26 and 27. The entire system is now running in its own lubricating oil and grease.

The liquid in the well in which the motor is submerged cannot gain access around the pump shaft 44 while running due to the equalizing back pressure developed along the shaft by the auxiliary pump 15. While the pump is at rest the grease seal in the stuffing box 43 as well as the valve acting clutch 8 will protect the motor in the manner before described.

From the foregoing it is believed that my invention may be clearly understood without further description, it being borne in mind that numerous changes may be made in the details of construction without departing from the spirit of the invention as set out in the appended claims. For instance the auxiliary pump 15 may be employed for discharging leakage into the well directly or otherwise instead of my preferred form of creating a back pressure along the shaft as above described, and while I have shown and described a gear pump, I may employ a rotary pump of another kind.

What I claim and desire to secure by Letters Patent is:—

1. A self-contained motor protecting unit for preventing water or other deleterious liquid from entering the casing of the motor of a submerged motor driven pump, comprising means for protecting the motor against the entrance of deleterious liquid while the motor is running, said means including a casing, a lubricating liquid reservoir in the casing; and a pump in the casing cooperating with the reservoir to pump the lubricating liquid.

2. A self-contained motor protecting unit for use with submerged motor driven pumps, comprising a casing, a shaft in the casing, a lubricating liquid reservoir in the casing, and a pump in the casing, arranged to feed liquid from the reservoir along said shaft.

3. A self-contained motor protecting unit for use with submerged motor driven pumps, comprising a casing, a shaft in the casing adapted to be driven by the motor, a lubricating liquid reservoir in the casing, and a pump in the casing for feeding lubricating liquid from the reservoir along the shaft in a direction away from the motor.

4. In combination, an encased motor having a shaft, a second shaft, a protecting unit arranged between the motor and second shaft, said protecting unit including a casing, shafting in the casing uniting the motor shaft to the second shaft, a lubricating liquid reservoir in the casing, and a pump in the casing for feeding lubricating liquid from the reservoir along the shafting in a direction away from the motor.

5. In combination, an encased motor having a shaft, a second shaft, and a protecting unit for said motor, said unit including a casing, shafting in the casing connecting the motor shaft to the second shaft, a lubricating oil reservoir arranged in the casing, a sleeve in the casing surrounding said shafting, and a pump in the casing driven by said shafting for forcing oil from the reservoir into the sleeve in a direction away from the motor for preventing deleterious liquid from feeding along the shafting to the motor.

6. In combination, an encased motor having a shaft, a second shaft, and a protecting unit for said motor, said unit including a casing, shafting in the casing connecting the motor shaft to the second shaft, a lubricating oil reservoir arranged in the casing, a sleeve in the casing surrounding said shafting, and a pump in the casing driven by said shafting for forcing oil from the reservoir into the sleeve in a direction away from the motor for preventing deleterious liquid from feeding along the shafting to the motor, said lubricant pump being of the rotary type and provided with a plurality of suction valves and a plurality of discharge valves, so arranged that the pressure created by the pump remains on the same side thereof, irrespective of the direction of rotation.

7. A self-contained unit for protecting the motor of a submerged motor driven pump, comprising a casing, a lubricating liquid reservoir in the casing, shafting in the casing, a sleeve surrounding the shafting, and a gear pump driven by the shafting, arranged in the casing and functioning to pump liquid from the reservoir along said shafting between the latter and said sleeve.

8. A self-contained unit for protecting the motor of a submerged motor driven pump, comprising a casing, a partition arranged transversely across the interior of the casing, shafting in the casing extending through said partition, a lubricating liquid reservoir in the casing at one side of said partition, the shafting projecting beyond the other side of the partition, and a pump in the partition, driven by said shafting for forcing the lubricating liquid from the reservoir through the partition and along the projecting portion of the shafting.

9. A self contained unit for preventing leakage water or the like from entering an encased motor of a submerged motor driven pump, comprising a casing, means in the casing for protecting the motor while running, said means including a lubricating liquid reservoir and a pump cooperating with the reservoir to pump the lubricating liquid, and means also in the casing for use in protecting the motor while it is at rest, said last mentioned means including a grease reservoir and a device for exerting pressure on the grease in the reservoir.

10. A self-contained unit for preventing deleterious liquid from entering the motor casing of a submerged motor driven pump, comprising a unit casing, shafting in the unit casing adapted to be driven by the motor, a sleeve in the unit casing having a valve seat, a clutch associated with the shafting for moving the valve away from the seat while the shafting is in operation, a lubricating liquid reservoir in the unit casing, and a pump in the unit casing driven by the shafting and arranged to force lubricating liquid from the reservoir through the sleeve and past said valve seat.

11. In a protecting unit for the motor of a submerged motor driven pump, a casing, shafting in the casing adapted to be driven by said motor, a partition extending transversely across the interior of the casing and formed of superposed plates, communicating ports in the plates, pump gears in the partition, a lubricating oil reservoir in the casing, an intake valve associated with certain of said ports, an outlet valve associated with the same ports, and shafting in the casing extending through the partition for driving said pump gears to cause lubricating oil from the reservoir to be forced through certain of the ports and along said shafting.

12. A self-contained unit for protecting the encased motor of a submerged motor driven pump, comprising a casing, shafting in the casing provided at one end with means for detachably connecting the same to a motor shaft, and provided at its opposite end with means for connecting the same to a pump shaft, a lubricating oil reservoir in the casing, and a pump in the casing driven by said shafting and arranged to pump oil from the reservoir along said shafting.

13. A self-contained unit for protecting the encased motor of a submerged motor driven pump, comprising a casing, closing members at the ends of the casing adapted to be detachably connected to a pump and motor, shafting extending through the casing and said closing members, and provided at its ends with means for detachably connecting the same to a motor shaft and pump shaft, a liquid reservoir in the casing, and a pump in the casing driven by said shafting and arranged to force liquid from the reservoir along said shafting.

14. A self-contained unit for protecting the encased motor of a submerged motor driven pump, comprising a casing, partition means in the casing dividing the same into a grease chamber and a lubricating oil chamber, shafting in the casing extending through the partition means, and a pump in the partition means driven by said shafting for forcing oil from the lubricating oil chamber along said shafting.

15. In combination, an encased motor having a shaft, a second shaft, a protecting unit arranged between the second shaft and motor and detachably connected to the latter, shafting extending through said casing and connected to the motor shaft and second shaft, a lubricant reservoir arranged in the casing, and means in the casing for forcing the lubricant in a direction away from the motor and into contact with one of said shafts.

16. A protecting unit for the encased motor of a submerged motor driven pump, comprising a casing, a partition in the casing dividing the same into a plurality of chambers, shafting in the casing adapted to be driven by the motor and extending through the partition, a pump in the casing driven by said shafting and adapted to draw liquid from one of said chambers and feed the same along said shafting, and a spring pressed plunger in the other chamber adapted to force a lubricant from the last mentioned chamber, for use in lubricating the shaft of said motor driven pump.

17. A protecting unit for the encased motor of a submerged motor driven pump, comprising a casing, shafting extending through said casing, a grease reservoir in the casing surrounding said shafting, and an annular spring pressed plunger arranged in the casing for forcing the lubricant from said reservoir.

18. In combination, an encased motor having a shaft, a second shaft, and a protecting unit for the motor arranged between the motor and second shaft, said unit comprising a casing, shafting extending through the casing and connecting the motor shaft to the second shaft, a grease reservoir in the casing, means for conducting grease from said reservoir to the second shaft, and a pump in the casing for exerting pressure along the shafting in a direction away from the motor.

19. In combination, an encased motor having a shaft, a second shaft, and a protecting unit for the motor arranged between the motor and second shaft, said unit comprising a casing, shafting extending through the casing and connecting the motor shaft to the second shaft, a grease reservoir in the casing, means for conducting grease from said reservoir to the second shaft, and a pump in the casing for exerting pressure along the shafting in a direction away from the motor, said grease reservoir being provided with an annular spring pressed plunger surrounding said shafting.

20. In combination, an encased motor having a shaft, a second shaft, and a protecting unit for the motor arranged between the motor and second shaft, said unit comprising a casing, shafting extending through the casing and connecting the motor shaft to the second shaft, a grease reservoir in the casing, means for conducting grease from said reservoir to the second shaft, and a pump in the casing for exerting pressure along the shafting in a direction away from the motor, said casing being provided with a partition separating the reservoir from the remainder of the interior of the casing, and said last mentioned pump being mounted in said partition.

21. In a self-contained unit for protecting the motor of a submerged motor driven pump, a casing, shafting in the casing, a sleeve surrounding a portion of the shafting, a valve seat on the sleeve, a valve mounted on the shafting, and clutch means on the shafting connected to the valve for moving the latter away from the valve seat when the shafting is rotated.

In testimony whereof I affix my signature.

ARMAIS ARUTUNOFF.